United States Patent [19]
Phillips et al.

[11] 3,799,642
[45] Mar. 26, 1974

[54] HOLOGRAPHIC RECORDING ON PHOTOCHROMIC LITHIUM NIOBATE

[75] Inventors: William Phillips, Princeton; David Lloyd Staebler, Trenton, both of N.J.

[73] Assignee: RCA Corporation, New York, N.Y.

[22] Filed: Mar. 27, 1973

[21] Appl. No.: 345,323

[52] U.S. Cl............ 350/3.5, 96/27 H, 96/90 PC, 252/300, 350/160 P
[51] Int. Cl. ........................................... G02b 27/00
[58] Field of Search........ 350/3.5, 160 P; 96/90 PC, 96/27 H; 252/300

[56] References Cited
UNITED STATES PATENTS
3,703,328  11/1972  Glass et al. ...................... 350/3.5

OTHER PUBLICATIONS

Phillips et al., RCA Review, Vol. 33, No. 1, March 1972, pp. 94–109.
Bordogna et al., RCA Review, Vol. 33, No. 1, March 1972, pp. 227–247.

*Primary Examiner*—Ronald J. Stern
*Attorney, Agent, or Firm*—Glenn H. Bruestle; Birgit E. Morris

[57] ABSTRACT

Photochromic lithium niobate crystals containing iron and either manganese or copper are useful for recording phase holograms in the photosensitive state of the crystals, which holograms can be permanently fixed and read out without loss in the quality of the image obtained therefrom over extended periods.

6 Claims, 3 Drawing Figures

HOLOGRAPHIC RECORDING ON PHOTOCHROMIC LITHIUM NIOBATE

This invention relates to single crystal electro-optic materials useful for recording phase holograms. More particularly, this invention relates to lithium niobate crystals which are photochromic and are useful as a holographic storage medium.

The invention herein described was made in the course of or under contract with the Department of the Navy.

BACKGROUND OF THE INVENTION

The recording of phase holograms in electro-optic materials, particularly single crystals of lithium niobate, is known. Recording of phase holograms in lithium niobate crystals is done by generating an interference pattern through interaction between a coherent reference beam and an object beam. The object beam carries spatial modulation corresponding to the image to be recorded. The light pattern formed by the interference between the object beam and the reference beam causes a change in the index of refraction of the lithium niobate crystal. The resultant refractive index pattern is a three dimensional pattern representative of the object or information recorded. The information can be read out by addressing the crystal with coherent readout light in the direction of the reference beam. This light is phase modulated in accordance with the recorded refractive index pattern and reproduces the object beam by wavefront reconstruction.

DESCRIPTION OF THE PRIOR ART

Lithium niobate crystals can be doped with iron or manganese to enhance the sensitivity of the crystal, as has been disclosed in a copending application of Amodei and Phillips entitled Improved Crystals for Recording Phase Holograms, Ser. No. 196,733 filed Nov. 8, 1971. These crystals are sensitive to light, however, and when impinged upon during readout by coherent light of the same intensity as that used for recording, the holograms are erased. A method of permanently fixing holograms in electro-optic materials has been disclosed in a copending application of Amodei and Staebler, entitled Process for Fixing Holographic Patterns in Electro-Optic Crystals and the Crystals Produced Thereby, Ser. No. 295,851 filed Oct. 10, 1972. By heating or irradiating the crystal during or subsequent to recording, the holograms are "fixed" by replacing the original electronic charge pattern in the crystal with a permanent ionic charge pattern. Accordingly, lithium niobate crystals containing holographic information in permanent form can be prepared.

One problem which has arisen in fixed iron-doped lithium niobate crystals is that, because the crystal is still highly sensitive to light, the holographic image quality deteriorates with increasing readout time, causing a reduction in resolution that results in development of a grainy image. The original high quality image can be restored by subjecting the crystal to incoherent light irradiation, for example. However, this requires additional equipment and adds to the costs and complexity of storing information by this method.

SUMMARY OF THE INVENTION

We have found that lithium niobate crystals doped with both iron and either manganese or copper are photochromic in addition to being highly sensitive electro-optic recording media. These crystals are highly suitable for recording holographic information in permanent form by a method whereby holographic information is recorded and fixed while the crystal is in its sensitive state, and the crystal is switched to its insensitive state for readout. In the insensitive state loss in the quality of images obtained is not noted even after prolonged readout periods.

DETAILED DESCRIPTION OF THE INVENTION

Figure 2:
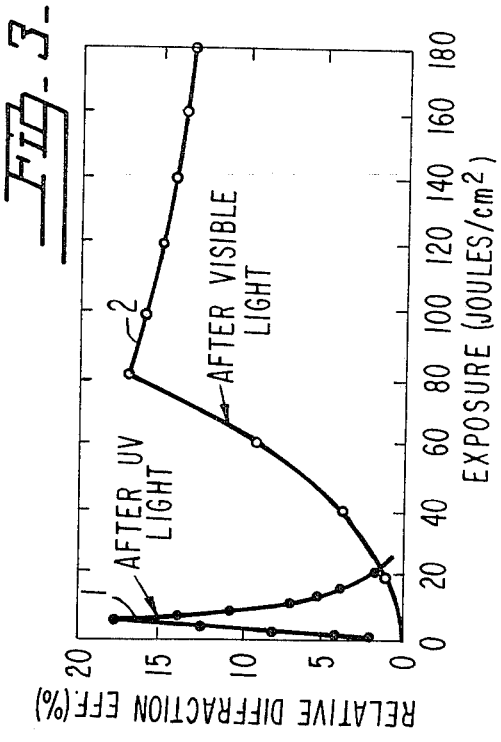
FIG. 2 is a graph of optical density as a function of wavelength of incident light for a photochromic lithium niobate crystal.

The novel electro-optic recording media of the invention are single crystals of lithium niobate containing at least about 0.001 mol percent of iron and at least about 0.001 mol percent of either manganese or copper. The relative amounts of iron and manganese or copper are not critical in order to obtain the photochromic effect and up to about 0.15 mol percent or more of the dopants can be present; however, crystals containing very high amounts of dopants, while they will have increased sensitivity to light, will be darkly colored, detracting from the intensity of the reconstructed images recorded therein. In general, crystals suitable for holographic recording and storage will contain from about 0.001 to about 0.05 mol percent of iron and from about 0.001 to about 0.05 mol percent of manganese or copper. The iron can be the major or minor dopant, or equal amounts of each dopant can be employed.

The doped lithium niobate crystals can be readily prepared by the Czochralski crystal growth technique. Approximately equimolar amounts of lithium carbonate and niobium pentoxide are fused and reacted at elevated temperatures. The two desired dopants are added to the reaction mixture. Crystals of lithium niobate are grown from the metal about a suitable seed crystal by pulling, and the crystal annealed and cooled under controlled temperature conditions. The crystals obtained by the above method have variable and reversible sensitivity induced by their photochromism.

According to the present method for recording high quality, permanent phase holograms, a doubly doped crystal prepared as above is photochromically switched by exposing it to UV light of about 3500–4000 A wavelength. The crystal will darken in color and is now in a state most sensitive to light, i.e., it contains a high proportion of the iron in its divalent state. Holograms can be rapidly recorded and fixed in this sensitive state. The crystal can be bleached, or switched to the state most insensitive to light either by heating or by exposing to visible light.

According to the heating method, after fixing, the crystal can be heated for a time and temperature sufficient to bleach the crystal, but insufficient to erase the hologram stored in the crystal. Referring now to FIG.

1, the three lines of the graph show the half times for fixing and erasing a hologram in a lithium niobate crystal and for bleaching photochromic coloration. Reference to the graph shows that at a temperature of about 120°C., a hologram will be fixed after heating for about 60 seconds, the crystal will be bleached after heating for about one hour, and a hologram will be erased after heating for about 24 hours.

According to the exposure method, after fixing and cooling the crystal to room temperature in the dark, the crystal is bleached by exposing to light having a wavelength in the visible range, i.e., 4000–7000 A.

The bleached crystal containing a fixed hologram can be read out continuously or intermittently with no loss in the quality of the image after extended periods. Thus the present crystals provide photochromic electro-optic media in which phase holograms can be rapidly written, fixed to form permanent holograms, photochromicaly switched and read out with light beams of the same intensity used for writing to give distortion free, high quality images having long life-times.

In addition, in its high sensitivity state, the doubly doped lithium niobate crystals display a fairly symmetric write-erase characteristic. Thus the crystals are also useful for applications where fast-write, fast-erase characteristics are required.

The invention will be further illustrated by the following examples, but it is to be understood that the invention is not meant to be limited to the details described therein.

EXAMPLE 1

About 1 mol each of lithium carbonate and niobium pentoxide were admixed and added portionwise to a 100 cc platinum crucible. The mixture was heated after each addition in a resistance furnace at about 1260°C. until the reactants fused and reacted. During the last additions, 0.05 mol percent of iron as iron oxide and 0.005 mol percent of manganese as manganese dioxide were also added. When addition was complete, the crucible was placed in the resistance furnace and brought to a temperature of about 1260°C., when growth about a c axis oriented seed crystal was initiated. The growing crystal was pulled from the melt at about 5 mm/hr. while rotating at about 12–30 revolutions per minute.

When crystal growth was complete, the crucible was lowered into a well in the bottom of the furnace and the crystal was annealed in a nearly isothermal environment in the center of the furnace at about 1100°C. for 4–5 hours, and was then slowly cooled at a rate of about 50°C./hr. to room temperature. The crystal was then poled by passing a small current through it at a temperature of about 1200°C.

A sample about 0.5 cm in thickness was cut from the crystal.

Referring now to FIG. 2, the crystal sample was exposed to UV light, with a 500 watt high pressure mercury lamp using a Corning 7–59 filter with a copper sulfate solution filter. The crystal darkened. About 50–100 Joules/cm$^2$ of incident energy was required to fully darken the crystal. The absorption state was measured with a recording spectrophotometer. Curve 1 of FIG. 2 shows the optical density of the darkened crystal as a function of wavelength.

The crystal was then exposed to a light beam in the visible wavelength range provided by the mercury lamp using a Corning 3–70 filter with a water filter. The color of the crystal became lighter. Curve 2 of FIG. 2 shows the optical density as a function of wavelength in the bleached state. The difference in the two curves shows the photochromism of the crystal.

Figure 3:
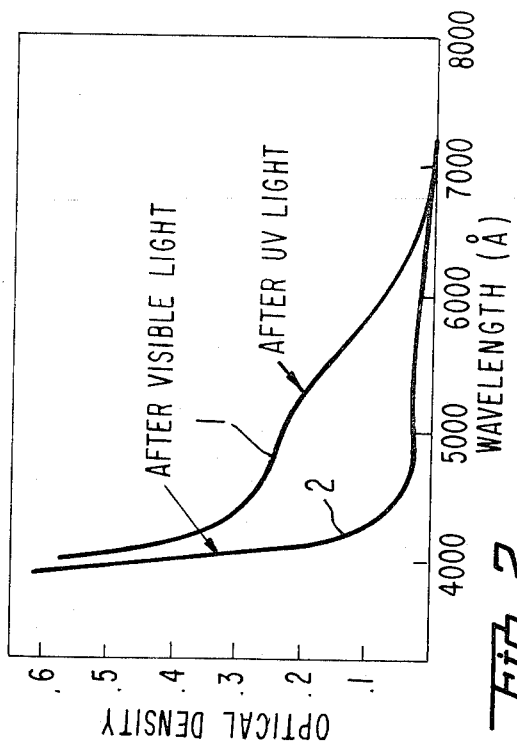
FIG. 3 is a graph of diffraction efficiency in percent as a function of exposure for a photochromic lithium niobate crystal.
Figure 1:
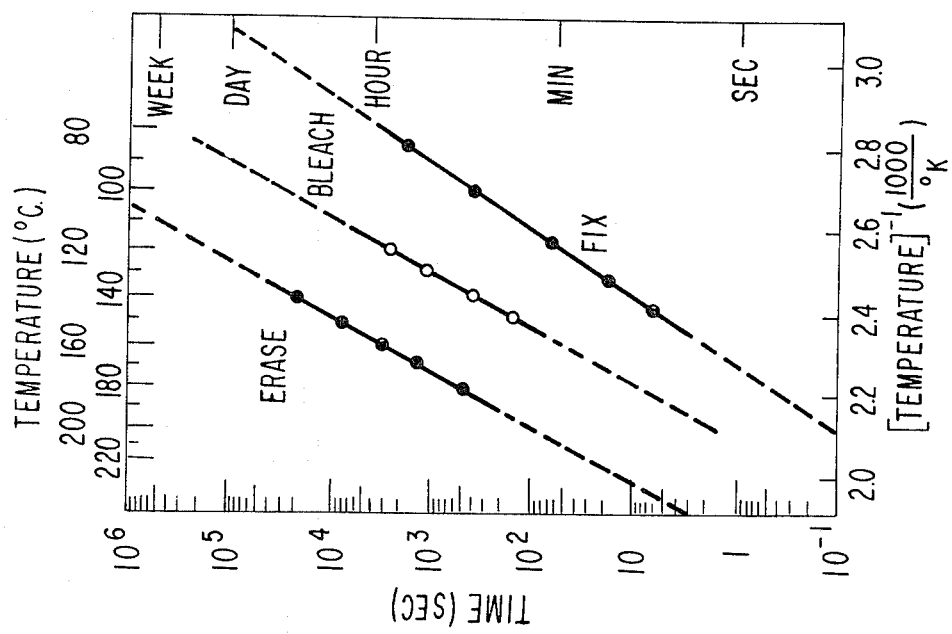
FIG. 1 is a graph of the half times required to fix and to erase holographic information and to bleach a photochromic crystal from its sensitive to its insensitive state at various temperatures.

FIG. 3 shows the performance for hologram storage and erasure of the crystal in its two absorption states. Holograms were recorded with two incident coherent light beams at 4880A about 0.5 cm wide meeting at a 30° angle. Polarization vector and crystal c axis were in the plane of incidence. Referring now to FIG. 3, the relative diffraction efficiency of the crystal in percent in its sensitive state, with exposure to a coherent light beam at 4880A, designated as curve 1, shows a rapid change corresponding to the fast-write, fast-erase characteristics of the crystal in this state. Curve 2 shows the behavior of the crystal in its insensitive state, after exposure to visible light, with its much slower write-erase characteristics.

EXAMPLES 2–5

Other doubly doped crystals were made according to the procedure of Example 1 except varying the amounts of the dopants added, as follows:

| Example | Iron, Mol % | Manganese, Mol % |
|---|---|---|
| 2 | 0.001 | 0.001 |
| 3 | 0.03 | 0.005 |
| 4 | 0.005 | 0.03 |
| 5 | 0.015 | 0.015 |

All of the crystals were photochromic.

EXAMPLES 6–7

The general procedure of Example 1 was followed except that copper was substituted for manganese as follows:

| Example | Iron, Mol % | Copper, Mol % |
|---|---|---|
| 6 | 0.015 | 0.15 |
| 7 | 0.015 | 0.015 |

These crystals were photochromic.

COMPARATIVE EXAMPLE

The general procedure of Example 1 was followed, varying the dopants, which were added as their respective oxides in the following combinations: iron-molybdenum; iron-tungsten; iron-titanium; iron-vanadium; iron-cobalt; nickel-molybdenum, and copper-manganese. None of these crystals displayed photochromic behavior.

We claim:

1. A method of recording phase holograms which comprises exposing a photochromic lithium niobate crystal containing at least about 0.001 mol percent of iron as a first dopant and at least about 0.001 mol percent of a second dopant selected from the group consisting of manganese and copper to ultraviolet light and recording a hologram in the crystal in the form of a spatial pattern with a modulated coherent object beam and a coherent reference beam in the visible wavelength range.

2. A method for producing one or more light stable phase holograms in an electro-optic crystal which comprises exposing a photochromic lithium niobate crystal containing at least about 0.001 mol percent of iron as a first dopant and at least about 0.001 mol percent of a second dopant selected from the group consisting of manganese and copper to ultraviolet light, recording a hologram in the crystal in the form of a spatial pattern with a modulated coherent object beam and a coherent reference beam in the visible wavelength range, fixing the pattern so as to replace the original electronic charge pattern with an ionic charge pattern, and bleaching the crystal to its insensitive state.

3. A method according to claim 2 wherein the bleaching step comprises exposing the crystal to incoherent visible light.

4. A method according to claim 2 wherein the bleaching step comprises heating the crystal for a time long enough to photochromically switch it to its insensitive state but insufficient to erase the hologram.

5. In a system for recording phase holograms which comprises a laser, means for forming a modulated object beam and a reference beam in the visible wavelength range and an electro-optic crystal for recording the interference diffraction pattern formed by combining the object beam and the reference beam in the crystal, the improvement which comprises employing as the electro-optic crystal a photochromic lithium niobate crystal containing at least about 0.001 mol percent of iron as a first dopant and at least about 0.001 mol percent of a second dopant selected from the group consisting of manganese and copper, which crystal has been darkened by exposure to ultraviolet light.

6. The system according to claim 5 wherein the second dopant is manganese.

* * * * *

UNITED STATES PATENT OFFICE
CERTIFICATE OF CORRECTION

Patent No. 3,799,642          Dated March 26, 1974

Inventor(s) William Phillips and David Lloyd Staebler

It is certified that error appears in the above-identified patent and that said Letters Patent are hereby corrected as shown below:

Column 2, line 43, "metal" should be -- melt --.

Column 4, line 41 "0.015" (second occurrence) should be --0.15 --

Signed and sealed this 10th day of September 1974.

(SEAL)
Attest:

McCOY M. GIBSON, JR.
Attesting Officer

C. MARSHALL DANN
Commissioner of Patents